United States Patent [19]
Wadsworth et al.

[11] Patent Number: 5,976,362
[45] Date of Patent: Nov. 2, 1999

[54] FAUCET MOUNTED WATER FILTER

[75] Inventors: John Wadsworth, Los Angeles; William Patrick Conley, Thousand Oaks; Daniel T. Carty; Fredrick G. Doolittle, both of Danville; Edward B. Rinker, Oakland; Kaj A. Johnson, Livermore; Elizabeth Hedberg, Berkeley; Carl Kling, Walnut Creek, all of Calif.

[73] Assignee: The Clorox Company, Oakland, Calif.

[21] Appl. No.: 09/053,609

[22] Filed: Apr. 1, 1998

[51] Int. Cl.[6] .......................... B01D 17/12; B01D 35/143
[52] U.S. Cl. ..................... 210/87; 73/861.78; 210/94; 210/100; 210/232; 210/433.1
[58] Field of Search ................... 73/861.12, 861.79, 73/861.87; 210/85, 87, 91, 94, 138, 143, 232, 266, 282, 422, 423, 424, 433.1, 446, 449, 456, 460, 100; 200/81.9 M, 81.9 R

[56] References Cited

U.S. PATENT DOCUMENTS

| | | | |
|---|---|---|---|
| Re. 35,667 | 11/1997 | Helligman | 210/449 |
| 3,853,761 | 12/1974 | McClory | 210/449 |
| 4,147,631 | 4/1979 | Deines et al. | 210/282 |
| 4,172,796 | 10/1979 | Corder | 210/282 |
| 4,212,743 | 7/1980 | Van Meter et al. | 210/282 |
| 4,504,389 | 3/1985 | Rundzaitis | 210/424 |
| 4,686,037 | 8/1987 | Lang | 210/221.2 |
| 4,770,768 | 9/1988 | Lang | 210/94 |
| 5,256,287 | 10/1993 | Underwood | 210/282 |
| 5,527,451 | 6/1996 | Hembree et al. | 210/88 |
| 5,536,395 | 7/1996 | Kuennen et al. | 210/87 |
| 5,540,107 | 7/1996 | Silverman et al. | 210/87 |
| 5,653,868 | 8/1997 | Yanou et al. | 210/232 |
| 5,858,215 | 1/1999 | Burchard et al. | 210/87 |

OTHER PUBLICATIONS

Culligan, "Faucet Mount Filter Systems Installation, Use and Care Manual", Tech. Disclosure Bulletin, pp. 1, 7. (Date: At least as early as Sep., 1996).

Pur, "Use and Care Manual", Tech. Disclosure Bulletin, pp. 1, 2. (Date: At least as early as Sep., 1996).

*Primary Examiner*—Joseph W. Drodge
*Attorney, Agent, or Firm*—Francis Law Group

[57] ABSTRACT

A faucet mounted water filter is described, comprising a base having a water inlet upstanding from a first end of the base and attachable to a water faucet, a first water outlet downwardly directed from the first end of the base for discharging unfiltered water, a second water outlet downwardly directed from a second end of the base for discharging filtered water and a filter cartridge seat disposed on the second end of the base, a replaceable filter cartridge comprising a unitary subassembly including a closed outer cylindrical shell having top and side walls defining a chamber therein, a filter element disposed with the filter chamber and a filter cartridge base, latch means for demountably securing the filter cartridge in the housing cartridge seat, a diverter valve for selectively permitting the flow of water through the housing first water outlet and the filter cartridge, and an end-of-use indicator for determining the status of the filter element during use.

16 Claims, 16 Drawing Sheets

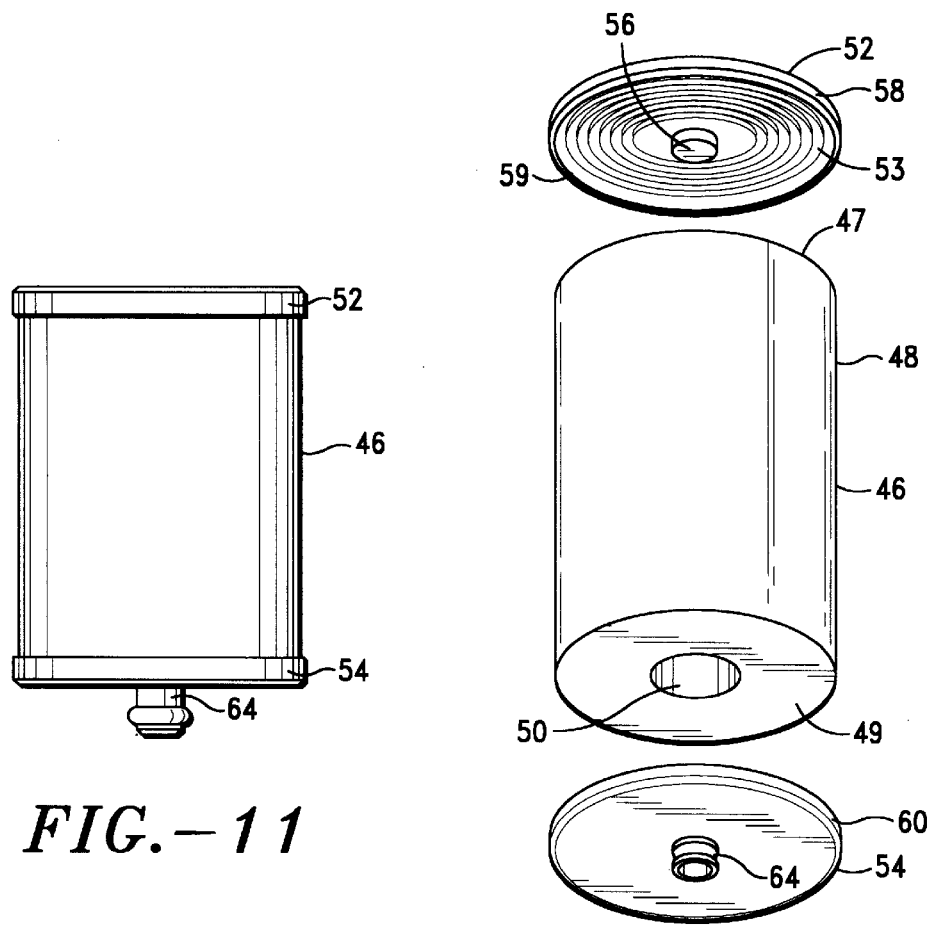
FIG.-11
FIG.-12
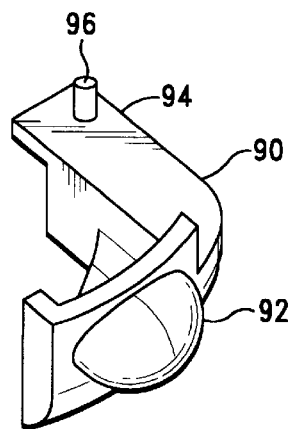
FIG.-17
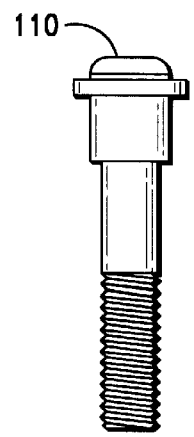
FIG.-20

FAUCET MOUNTED WATER FILTER

FIELD OF THE PRESENT INVENTION

The present invention relates generally to water filtration devices. More particularly, the invention relates to a faucet mounted water filter having a replaceable filter cartridge assembly.

BACKGROUND OF THE INVENTION

Faucet mounted water filters are well known in the art. Illustrative are the filter assemblies disclosed in U.S. Pat. Nos. 5,525,214; 4,172,796; 5,527,451; 4,686,037; 4,770,768; 3,853,761 and RE35,667.

The noted prior art filter assemblies do, however, have numerous drawbacks. The filter assemblies are typically complicated in construction, require numerous parts, and are, consequently, expensive to produce.

Further, many of the filter assemblies do not include an end-of-use indicator or any other means of determining the status of the filter element during use. As a result, filters may be employed beyond their useful life and may, in some instances, expose the user to undesirable contaminates.

The means employed in the remaining prior art assemblies to determine the status of the filter element (i.e., useful life) are generally complex gearing mechanisms or exteriorly located "color indicators", which exhibit the degree of filter element usage as a function of color change(s). The color indicators are thus dependent on a respective consumer's visual acuity. See, e.g., U.S. Pat. Nos. 4,686,037 and 5,527,451.

An additional drawback of the prior art filter assemblies is that the valve unit is generally complicated in construction and, hence, difficult to manufacture and mount in the assembly. Further, the operation of the valve unit is not reliable and tap water typically leaks from the valve unit when purified water is being obtained. The valve unit also becomes unserviceable in a relatively short period of time due to wear of the valve element disposed therein.

Equally important, many of the prior art filter assemblies have filter elements that do not filter the water adequately and, moreover, require the entire water filter assembly to be disconnected from the water faucet in order to replace the filter element.

It is, therefore, an object of the present invention to provide a new and improved faucet mounted water filter which overcomes the aforementioned disadvantages and otherwise undesirable features.

It is another object of the present invention to provide a water filter cartridge assembly that is readily replaceable as a unitary structure, economical and discardable as a unitary structure when expended.

It is a further object of the present invention to provide a faucet mounted water filter having simple, yet efficient engagement/release means, which cooperates with the replaceable cartridge assembly.

It is a further object of the present invention to provide a faucet mounted water filter having an efficient, reliable dual mode (i.e., time and volume) end-of-use indicator.

It is a further object of the present invention to provide an improved water filter that is inexpensive to manufacture, requiring less labor intensive techniques, less material, and easy to assemble.

It is still a further object of the present invention to provide a faucet mounted water filter that is aesthetically pleasing when installed in a home or a commercial environment.

These and other objects of the present invention will be apparent to those skilled in the art from the following detailed description of the invention and the accompanying drawings.

SUMMARY OF THE INVENTION

In accordance with the above objects and those that will be mentioned and will become apparent below, the faucet mounted water filter in accordance with this invention comprises a base having a water inlet upstanding from a first end of the base and attachable to a water faucet, a first water outlet downwardly directed from the first end of the base for discharging unfiltered water, a second water outlet downwardly directed from a second end of the base for discharging filtered water and a filter cartridge seat disposed on the second end of the base, a replaceable filter cartridge comprising a unitary subassembly including a closed outer cylindrical shell having top and side walls defining a chamber therein, a filter element disposed with the filter chamber and a filter cartridge base, latch means for demountably securing the filter cartridge in the housing cartridge seat, a diverter valve for selectively permitting the flow of water through the housing first water outlet and the filter cartridge, and an end-of-use indicator for determining the status of the filter element during use. In a preferred embodiment, the indicator includes monitoring means for monitoring the volume of water flow into the filter cartridge, processing means responsive to the monitoring means for recording the total volume of water flow into the filter cartridge and the time of use of the filter cartridge, and signaling means responsive to the processing means for providing at least first and second output signals, the processing means being programmed to provide outputs indicative (i) that the pre-determined maximum volume of water flow into the filter cartridge is non-imminent and has occurred and (ii) that the pre-determined maximum time of use of the filter cartridge is non-imminent and has occurred.

The advantages of this invention include (i) a highly efficient, replaceable filter cartridge assembly, (ii) simple, yet efficient engagement/release means, which cooperates with the replaceable cartridge assembly and (iii) a reliable dual mode end-of-use indicator for determining the status of the filter element during use.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 11 is a front plan view of the water filter element, according to the invention;

FIG. 12 is an exploded, perspective view of the filter element shown in FIG. 11, according to the invention;

FIG. 17 is a perspective view of the water filter latch button, according to the invention;

FIG. 20 is a front plan view of the water filter latch pin, according to the invention;

DETAILED DESCRIPTION OF THE PREFERRED EMBODIMENT

The faucet mounted water filter of the present invention substantially reduces or eliminates the disadvantages and shortcomings associated with prior art filters. As discussed in detail below, the water filter is mechanically simple, accurate and reliable and includes a readily replaceable cartridge assembly and a novel, dual mode (i.e., time, volume) end-of-use indicator.

Figure 1:
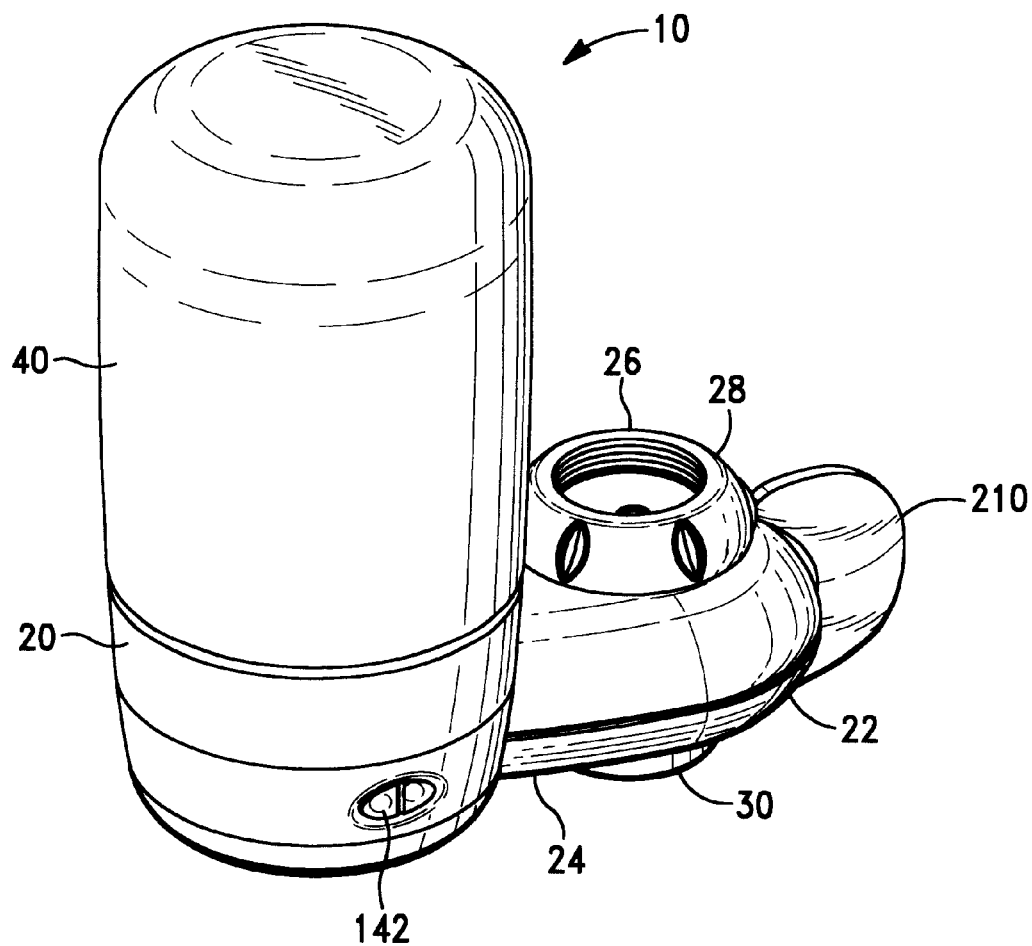
FIG. 1 is a perspective view of one embodiment of the faucet mounted water filter, according to the invention.

Referring first to FIG. 1, there is shown a prospective view of the faucet mounted water filter 10 of the present invention. The water filter includes a two-piece filter housing 20 and a filter cartridge assembly 40. The lower section 24 of the filter housing 20 encases the diverter valve assembly 170, discussed in detail below (see FIG. 4). The valve assembly includes a manually moveable valve handle 210 for selecting the water flow path (i.e., filtered, unfiltered spray, unfiltered aerated). The housing lower section 24 also includes an unfiltered water outlet 30 (see FIG. 3).

Figure 2:
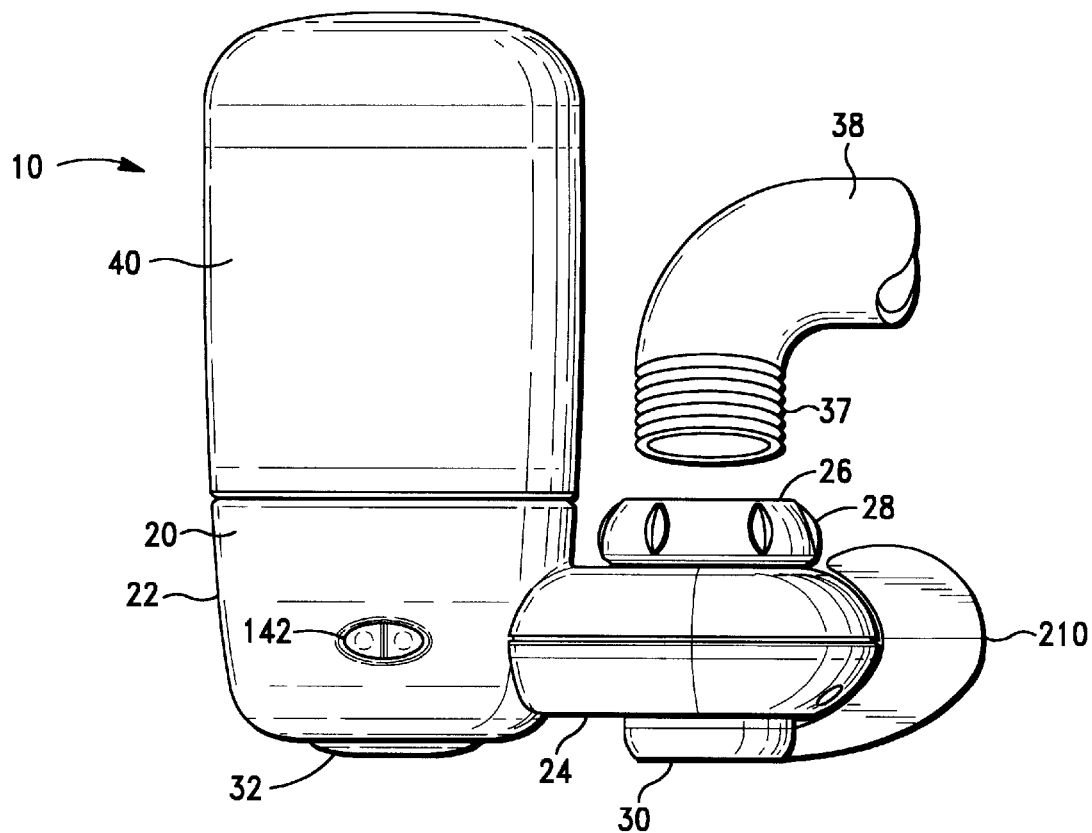
FIG. 2 is a front plan view of the water filter shown in FIG. 1, according to the invention.
Figure 7:
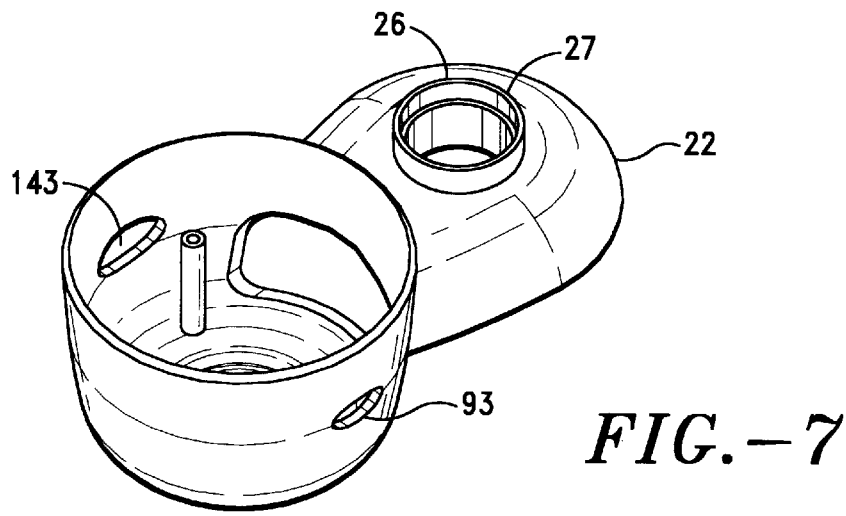
FIG. 7 is a top perspective view of the water filter upper housing section, according to the invention.

As illustrated in FIG. 2, the upper section 22 of the filter housing 20 includes a water inlet 26 disposed on the top portion of the upper housing section 22, a filtered water outlet 32 disposed on the bottom portion of the upper housing section 22 on the opposite end thereof, a filter cartridge assembly seat 29 and an end-of-use indicator assembly 124, 140, discussed in detail below. According to the invention, the water inlet 26 includes an internally threaded swivel collar 28 that is rotatably connected to the upper housing section water inlet flange 27 (see FIG. 7). The collar 28 is adapted to rotatably engage the threads 37 at the outlet end of the faucet 38, sealably securing the filter 10 thereon.

Figure 8:
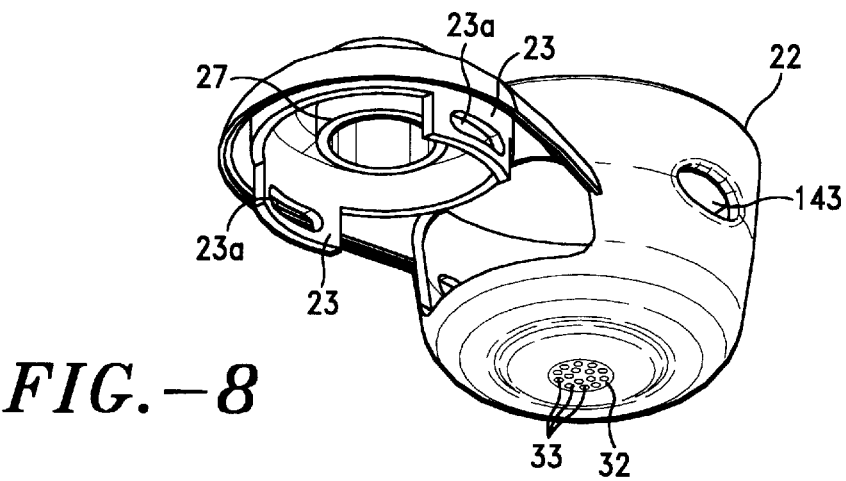
FIG. 8 is bottom perspective view of the water filter upper housing section shown in FIG. 7, according to the invention.

The upper housing section 22 further includes a latch button port 93 adapted to slideably receive the latch button 90, discussed in detail below, an end-of-use indicator light port 143, and a pair of engagement arms 23 (see FIG. 8). As discussed in detail below, the engagement arms 23 are adapted to engage the retaining tabs 187 disposed on the valve body 180 (see FIG. 24). Screws 116 are also provided to secure the upper and lower housing sections 22, 24 (see FIG. 4).

According to the invention, the upper and lower housing sections 22,24 may be constructed out of various high strength, light weight materials, such as acrylonitrile butadiene-styrene (ABS) and acetal compounds. In a preferred embodiment, the housing sections 22, 24 are constructed out of ABS.

Figure 3:
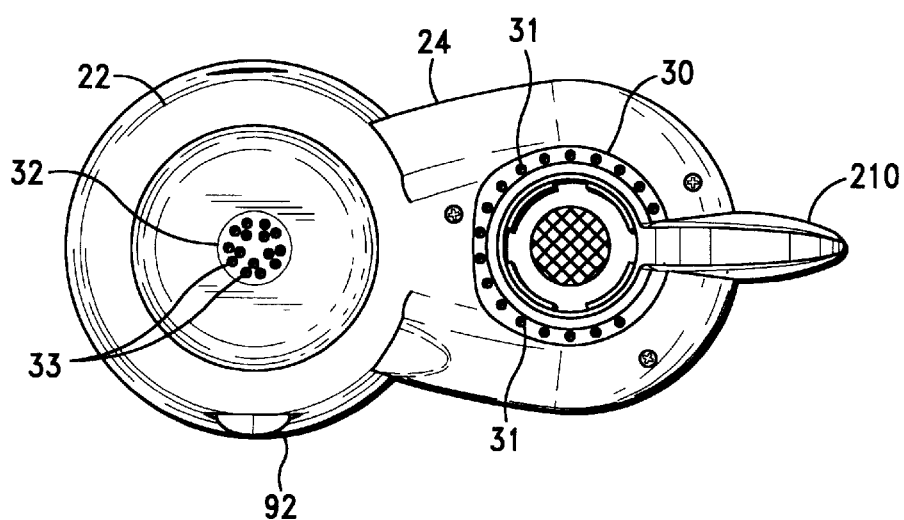
FIG. 3 is a bottom plan view of the water filter shown in FIG. 1, according to the invention.

Referring now to FIG. 3, the filtered water outlet 32 includes a plurality of substantially uniformly positioned outlet ports 33 to provide a substantially circular water spray pattern upon discharge of the filtered water through the water outlet 32. As will be appreciated by one having ordinary skill in the art, the filtered water outlet 32 may comprise various outlet port configurations and/or orientations to achieve various water spray patterns.

According to the invention, the unfiltered water outlet 30 provides two (2) water discharge (i.e. spray) patterns, discussed in greater detail below. The first discharge pattern comprises a substantially circular "shower spray" pattern. As illustrated in FIG. 3, the "shower spray" pattern is achieved by virtue of a plurality of unfiltered water outlet ports 31, disposed substantially about the circumference of the outlet 30.

Figure 29:
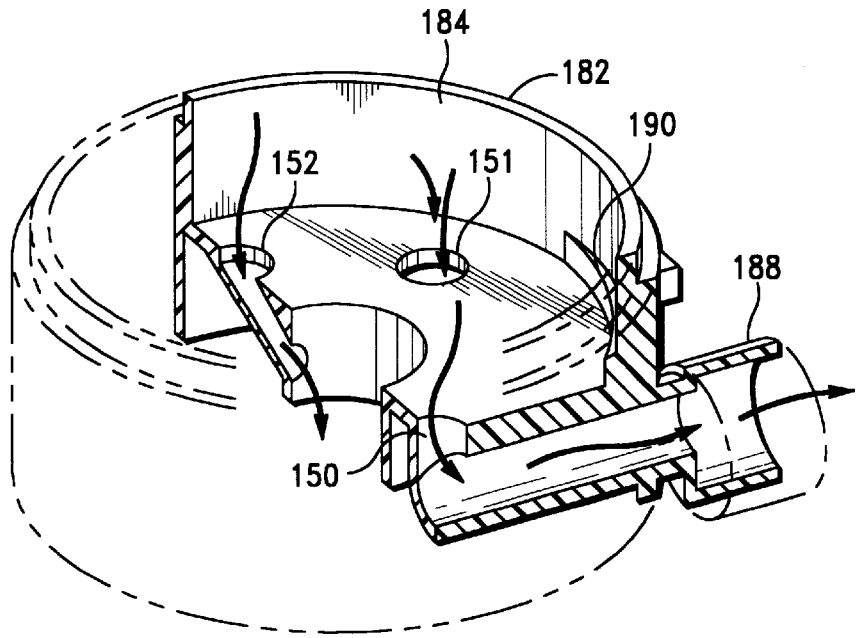
FIG. 29 is a partial perspective, cross-sectional view of the diverter valve body shown in FIG. 24, illustrating the water outlet ducts, according to the invention.
Figure 30:
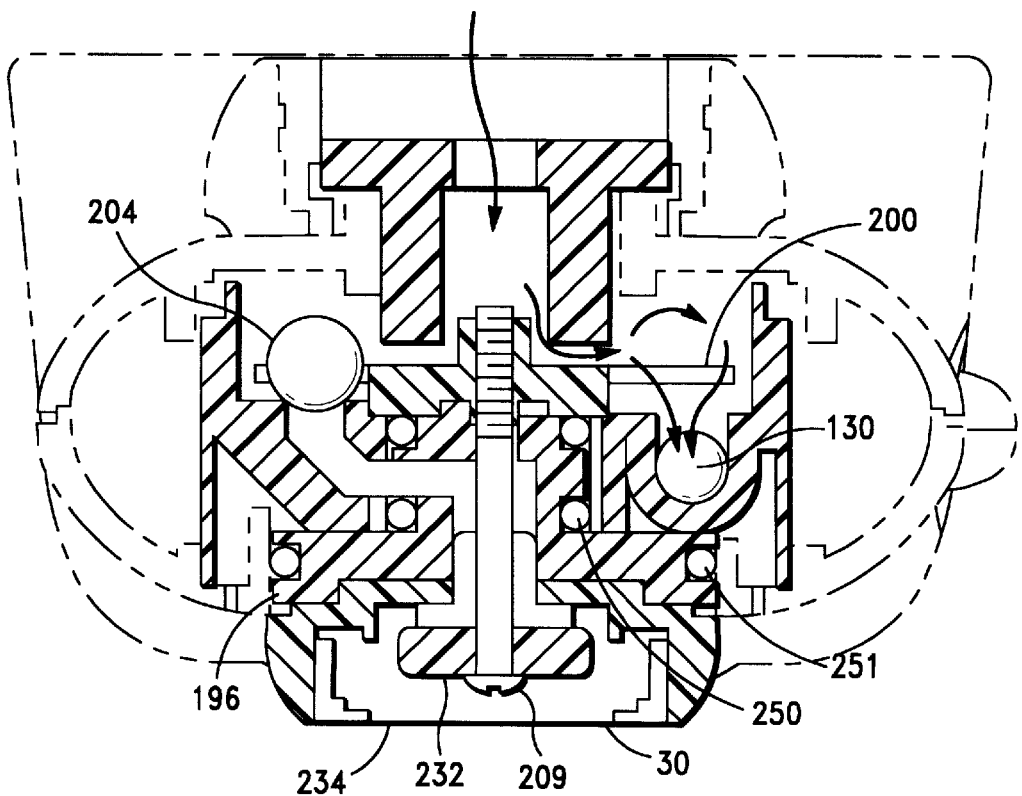
FIG. 30 is a partial cross-sectional view of the water filter, illustrating the filtered water flow from the diverter valve to the flow monitor, according to the invention.

The second discharge pattern comprises substantially aerated water flow. The aerated flow is achieved by virtue of the aerator assembly 230, discussed in greater detail below (see FIGS. 4 and 29).

Figures 9, 10:
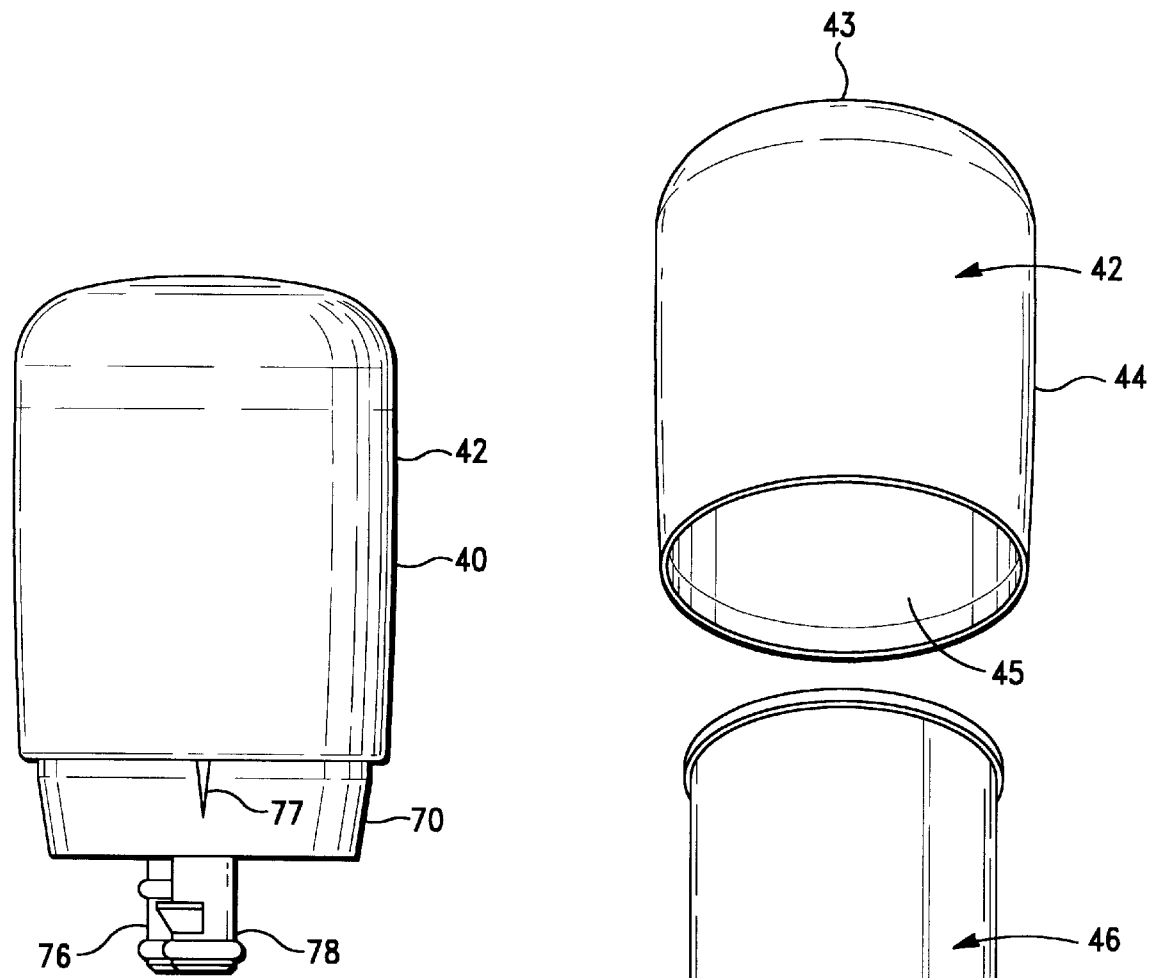
FIG. 9 is a front plan view of one embodiment of the water filter cartridge assembly, according to the invention.
FIG. 10 is a perspective, exploded view of the water filter cartridge assembly shown in FIG. 9, according to the invention.

Referring now to FIG. 9, there is shown one embodiment of the filter cartridge assembly 40 of the present invention. According to the invention, the filter cartridge assembly 40 includes: (i) a housing 42 having top and side walls 43, 44, respectively, defining a chamber 45 therein, (ii) a filter element 46 disposed within the housing chamber 45 and (iii) a cartridge base 70 (see FIG. 10).

Referring now to FIGS. 11 and 12, there is shown one embodiment of the filter element 46 of the invention. According to the invention, the filter element 46 comprises activated carbon particles integrally mixed with a bonding agent (e.g., thermoplastic or thermosetting polymeric material) and formed into a self-supporting, stable filter structure (i.e., carbon block). The filter element 46 may further include other appropriate material(s), such as bacteriastic materials, ion exchange resins and zeolites to assist the activated carbon in its filtration activity.

As illustrated in FIG. 12, the filter element 46 includes top, bottom and side walls 47, 48, 49, respectively, and a hollow core 50. As discussed in detail below, the inlet surface is preferably defined by the side wall 49.

According to the invention, the filter element 46 includes an end cap 52 and a thru cap 54 disposed on opposite ends thereof. The end cap 52 comprises a substantially circular disc having a centrally located, inwardly projecting boss 56 adapted to slideably engage the filter element core 50 and a circumferential flange 58 projecting from the bottom surface 53. The inside surface 59 of the end cap circumferential flange 58 preferably has a correspondingly similar shape as the filter element side wall 49.

The thru cap 54 similarly comprises a substantially circular disc having a circumferential flange 60 projecting from the bottom surface 55. The inside surface 62 of the thru cap flange 60 preferably has a correspondingly similar shape as the filter element side wall 49.

Figure 14:
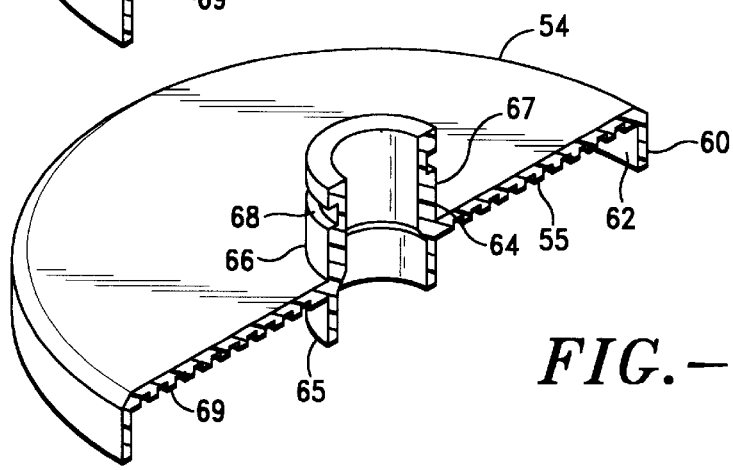
FIG. 14 is a perspective, cross-sectional view of the water filter element thru cap, according to the invention.

The thru cap 54 is further provided with a filter port 64 (see FIG. 14). The top portion 65 of the port 64 is adapted to engage and, hence, communicate with the filter core 50. The bottom portion 66 of the port 64 is adapted to slideably engage the cartridge base outlet port 78.

Referring now to FIG. 14, the bottom portion 66 of the filter port 64 preferably includes at least one annular grove 68 disposed on the outer surface 67 of the port 64. The groove 68 is adapted to receive a conventional O-ring 260 to facilitate the sealed engagement of the filter element 46 and filter cartridge base 70 (see FIG. 5).

Referring now to FIG. 12, the end cap 52 is preferably secured to the top surface 47 of the filter element 46 by conventional bonding means. The thru cap 54 is similarly secured to the bottom surface 49 of the filter element 46 by conventional bonding means.

According to the invention, various bonding means, such as silicon and hot melt adhesives, may be employed to bond the caps 52, 54 to the filter element 46. In a preferred embodiment, the caps 52, 54 are bonded to the filter element 46 via a conventional hot melt adhesive (e.g., HMSOL232).

Figure 13:
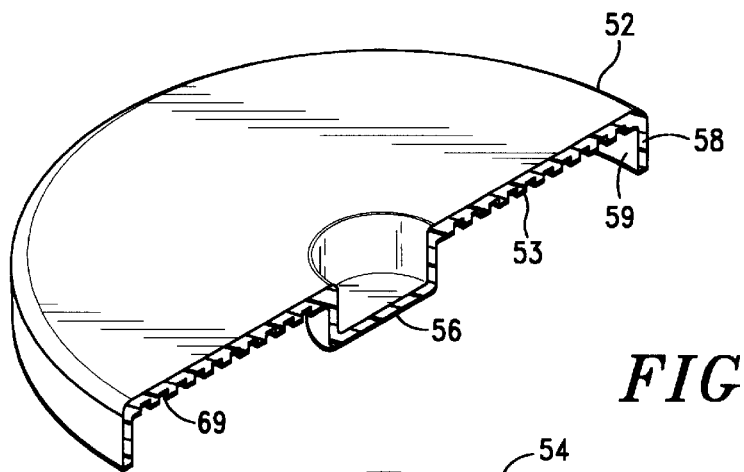
FIG. 13 is a perspective, cross-sectional view of the water filter element end cap, according to the invention.

As illustrated in FIGS. 13 and 14, the bottom surfaces 53, 55 of the caps 52, 55, respectively, are preferably provided with a plurality of substantially circular grooved rings 69 to facilitate bonding of the caps 52, 54 to the filter element 46. As will be appreciated by one having ordinary skill art, various surface configurations and/or treatments may be employed within the scope of the invention to facilitate bonding of the caps 52, 54 to the filter element 46.

Figure 15:
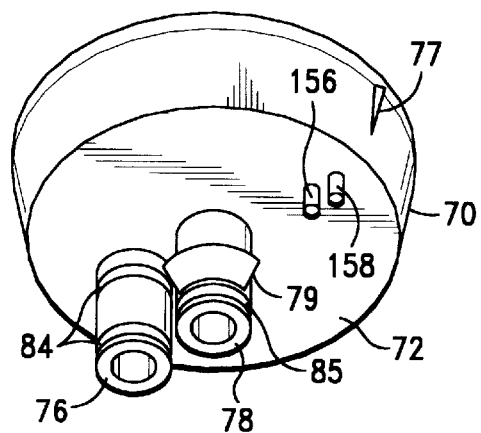
FIG. 15 is a bottom perspective view of the water filter cartridge assembly base, according to the invention.
Figure 16:
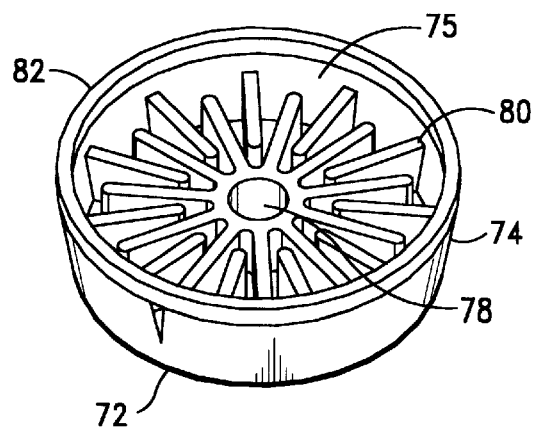
FIG. 16 is a top perspective view of the water filter cartridge assembly base shown in FIG. 15, according to the invention.

Referring now to FIGS. 15 and 16, there is shown one embodiment of the filter cartridge base 70 of the present invention. The base includes (i) bottom and side walls 72, 74 defining a chamber 75 therein, (ii) inlet and outlet ports 76, 78, and (iii) internal support ribs 80 disposed within the base chamber 75.

According to the invention, the inlet port 76 is preferably provided with two (2) annular grooves 84 adapted to receive a pair of conventional O-rings (not shown). Outlet port 78 is similarly provided with an annular groove 85 adapted to receive an O-ring (not shown). The O-rings facilitate the sealed engagement of the cartridge assembly 40 and filter housing 20 when the assembly 40 is operationally positioned thereon.

As illustrated in FIG. 16, the base support ribs 80 comprise a plurality of substantially planar projections disposed on the inside surface of the bottom wall 72. According to the invention, the ribs 80 provide structural integrity and substantially uniform distribution of the inlet water to and through the annular water distribution chamber 41 surrounding the filter element 46 when operatively disposed in the housing chamber 45 (see FIG. 5).

The cartridge base 70 is further provided with a cartridge engagement flange 82, disposed on the edge of the side wall 74, and an alignment slot 77 to facilitate alignment of the cartridge assembly 40 in the filter housing 20 during replacement. The engagement flange 82 preferably has a correspondingly similar shape as the cartridge housing side wall 44.

Figure 5:
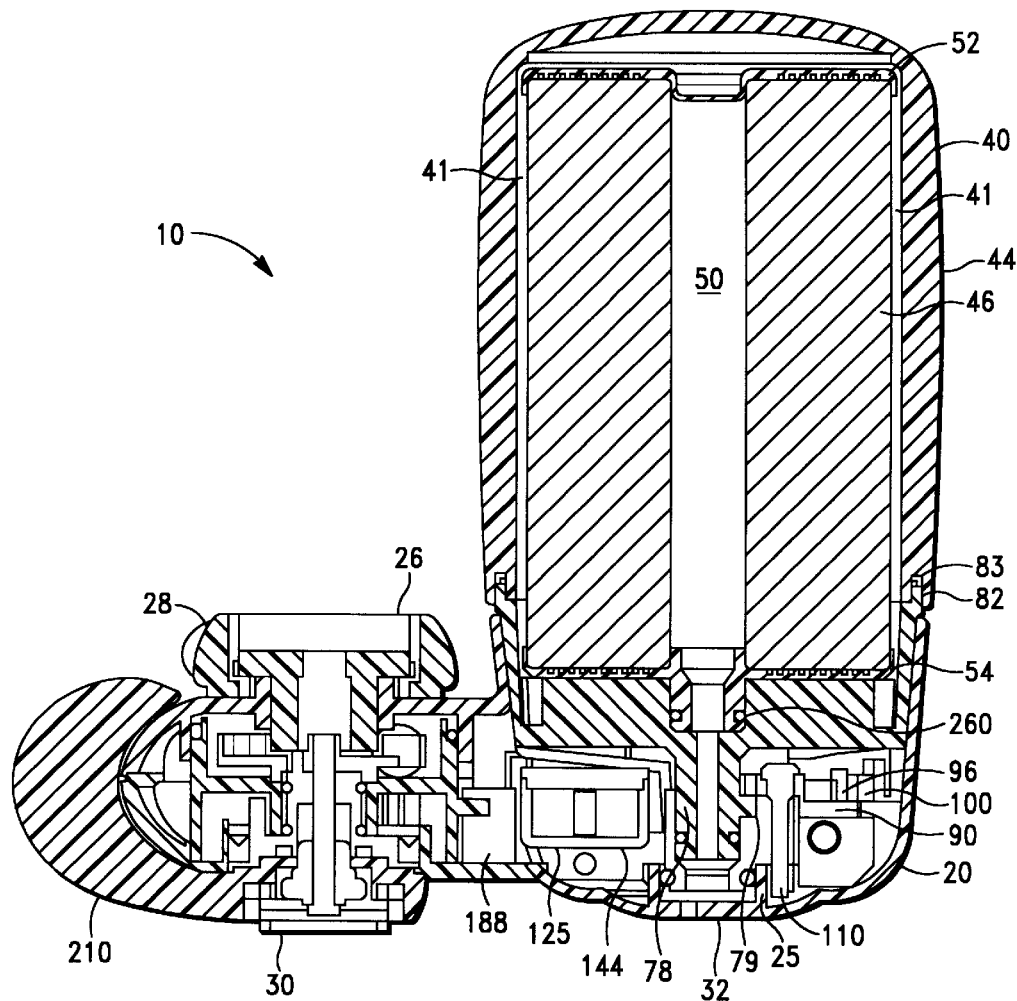
FIG. 5 is a rear cross-sectional view of the water filter, according to the invention.

As illustrated in FIG. 5, upon assembly of the filter cartridge assembly 40, the base flange 82 engages the cartridge base seat 83 disposed proximate the edge of the cartridge housing side wall 44. The base outlet port 78 is also adapted to receive and, hence, communicate with the filter port 64.

According to the invention, the cartridge base 70 is secured to the cartridge housing 42 by conventional bonding means, such as ultrasonic welding, spin welding and solvent cement. In a preferred embodiment, the base 70 is ultrasonically welded to the cartridge housing 42.

As will be appreciated by one having ordinary skill in the art, various light weight materials may be employed to construct the cartridge housing 42, end caps 52, 54 and base 70. In a preferred embodiment of the invention, the housing 42 and base to are constructed out of ABS and the caps 52, 54 are constructed out of polypropylene.

Referring now to FIG. 5, the cartridge base 70, which defines the bottom wall of the filter cartridge assembly 40 when operatively connected thereto, is supported by the upper section 22 of the filter housing 20. As discussed in detail below, when the base 70 is positioned in the cartridge assembly seat 29 and, hence, supported by the upper housing section 22, the water inlet 76 sealably engages the output duct 134 of the flow monitor 124 and the outlet port 78 communicates with the filtered water outlet 32 via interface plate outlet port 118.

A key feature of the present invention is the cartridge assembly 40 engagement/release means. As discussed in detail below, the engagement/release means provides reliable and efficient engagement and release of the cartridge assembly 40 to and from the filter housing 20 which is unparalleled in the art.

Figure 18:
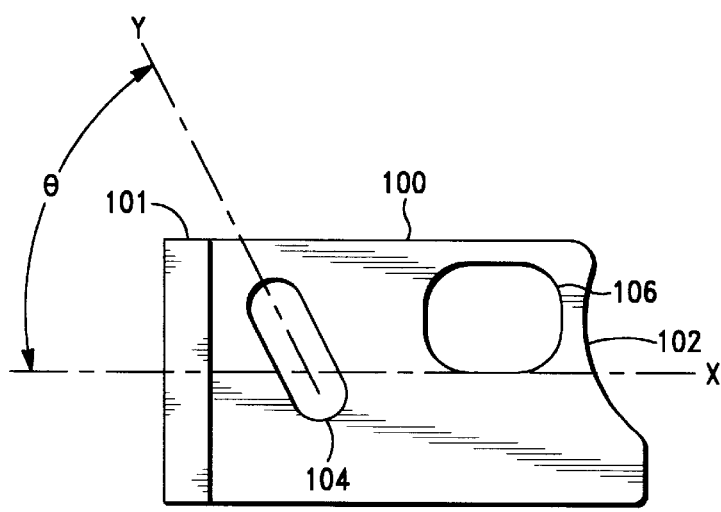
FIG. 18 is a top plan view of the water filter latch slide, according to the invention.
Figure 19:
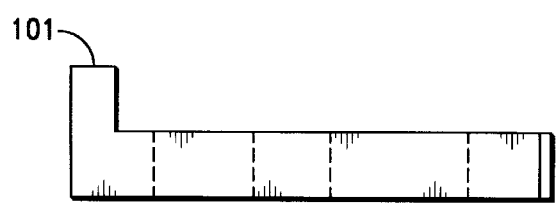
FIG. 19 is a side plan view of the latch slide shown in FIG. 18, according to the invention.

Referring to FIGS. 17–19, the cartridge assembly 40 engagement/release means includes a latch button 90, latch slide 100, latch pin 102 and spring 114. According to the invention, the latch button 90, slide 100 and pin 110 may similarly be constructed of various light weight, high strength materials. In a preferred embodiment, the button 90 is constructed out of an acetal compound, the slide 100 constructed out of polyoxymethylene (i.e., Delrin®) and the pin 110 constructed out of stainless steel.

As illustrated in FIG. 17, the latch button 90 includes an engagement button 92 projecting from one end thereof. The engagement button 92 is adapted to be slideably positioned in the latch button port 93 on the upper housing section 22 (see FIG. 7).

The latch button 90 is further provided with a latch button arm 94 and a latch button pin 96 disposed on one end of the arm 94 substantially opposite the engagement button 92. As discussed in detail below, the latch button pin 96 is adapted to slideably engage the latch slide 100.

Referring now to FIGS. 18 and 19, there is shown one embodiment of the latch slide 100. As illustrated in FIG. 20, the slide 100 generally comprises a substantially planar elongated plate having a substantially perpendicular projection 101 disposed on one end and a curved engagement surface 102 on the opposite end thereof. As discussed in detail below, the engagement surface 102 is adapted to engage the engagement flange 79 disposed on the outlet port 78 of the cartridge base 70 (see FIG. 15).

According to the invention, the slide 100 is provided with an angular slot 104 adapted to receive the latch button pin 96 and a guide slot 106. The guide slot 106 is disposed on the slide 100 in substantially parallel alignment with the longitudinal axis X of the slide 100.

As illustrated in FIG. 18, the angular slot 104 is disposed on the slide 100 at an angle θ preferably in the range of 60–65 degrees; θ being the angle formed at the intersection of the longitudinal axis Y of the slot 104 and the longitudinal axis X of the slide 100. Applicants have found that the noted slot 104 angle provides uniform, yet effective translation of motion, discussed in detail below, from the latch button 90 to the slide 100. However, as will be appreciated by one having ordinary skill in the art, various slot angles may be employed within the scope of the invention to achieve the desired interaction between the latch button 90 and the slide 100.

Figure 4:
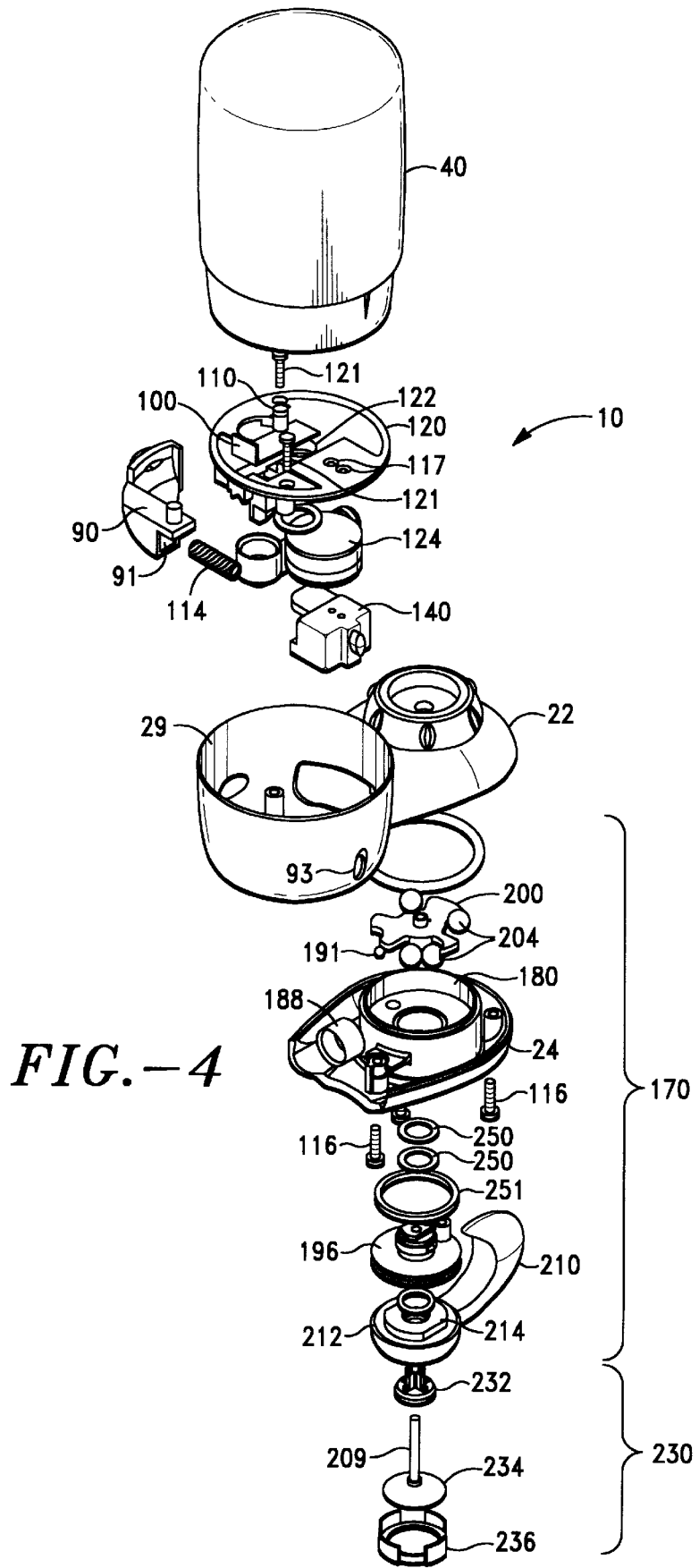
FIG. 4 is an exploded, perspective view of the water filter shown in FIG. 1, illustrating the assembly of the water filter, according to the invention.
Figure 6:
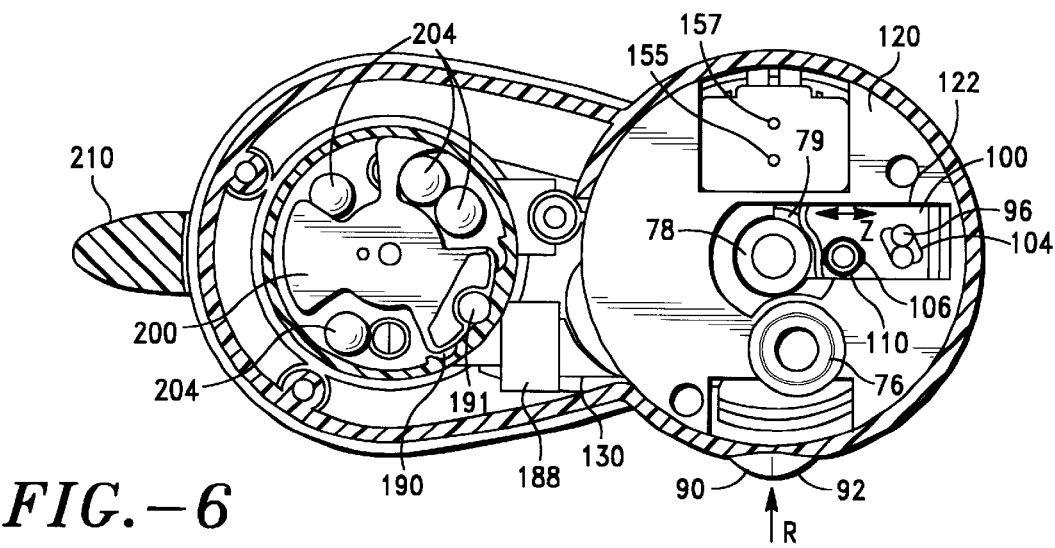
FIG. 6 is top cross-sectional view of the water filter housing, according to the invention.
Figure 41:
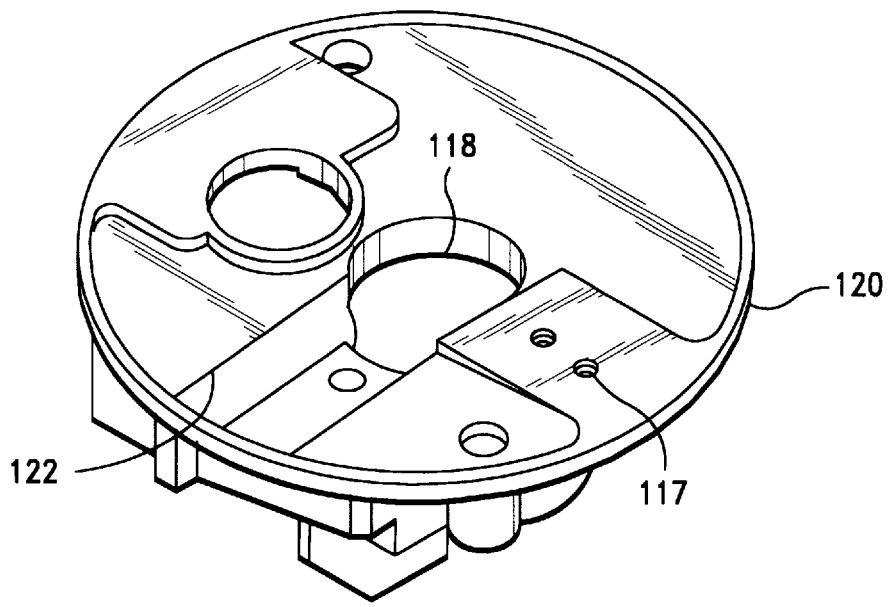
FIG. 41 is a top perspective view of the water filter interface plate shown in FIG. 40, according to the invention.

Referring now to FIG. 6, the latch slide 100 is operatively positioned in the latch slot 122 provided on the interface plate 120 (see also FIG. 41). As illustrated in FIG. 4, screws 121 are provided to secure the interface plate 120 in the upper housing section 22.

The latch pin 110 is disposed in the guide slot 106 and is also adapted to engage the upper housing section boss 25 (see FIG. 5). The latch button 92 is also operatively positioned below the interface plate 120 with the engagement button 92 positioned in the latch button port 93.

Figure 40:
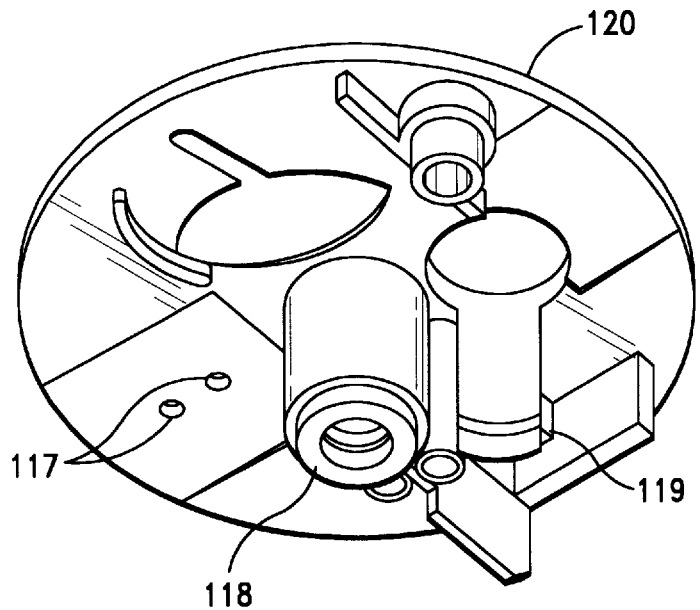
FIG. 40 is a bottom perspective view of the water filter interface plate, according to the invention.

Referring now to FIG. 4, the latch spring 114 is adapted to slideably engage the latch button spring seat 91 disposed on the bottom section of the latch button 90. According to the invention, the opposite end of the spring 114 abuts against the interface plate 120 spring seat 119 when the latch assembly 90, 100, 110, end-of-use indicator assembly 124, 140 and the interface plate 120 are operatively positioned in the upper housing section 22 (see FIGS. 5 and 40). The spring 114, thus, biases the latch button 90 outwardly and, hence, biases the slide 100 inwardly.

Referring now to FIGS. 5 and 6, in operation, the cartridge assembly 40 is positioned on the upper housing section 22, whereby (i) the base inlet port 76 sealably engages the outlet port 134 of the flow monitor 124, (ii) the base outlet port 78 communicates with the filtered water outlet 32 (via interface plate output port 118) and (iii) the latch slide 100 engages the engagement flange 79, securing the cartridge assembly 40 therein. To release the cartridge assembly 40, the latch button 90 is pressed in the direction denoted by arrow R, causing pin 96 to move in a substantially linear direction in angular slot 104. By virtue of the angular slot 104 and guide slot 106 (with latch pin 110 operatively disposed therein), the linear movement of the pin 96 in the angular slot 104 provides motion of the latch slide 100 substantially perpendicular to the movement of the pin 96 (denoted by arrow Z).

Figure 21:
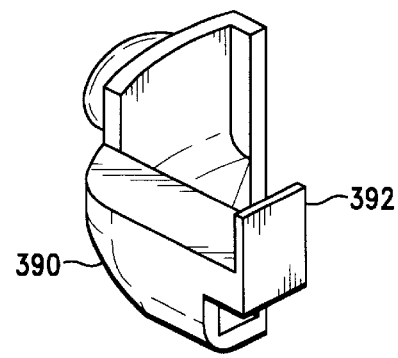
FIG. 21 is a perspective view of an additional embodiment of a water filter latch button, according to the invention.
Figure 22:
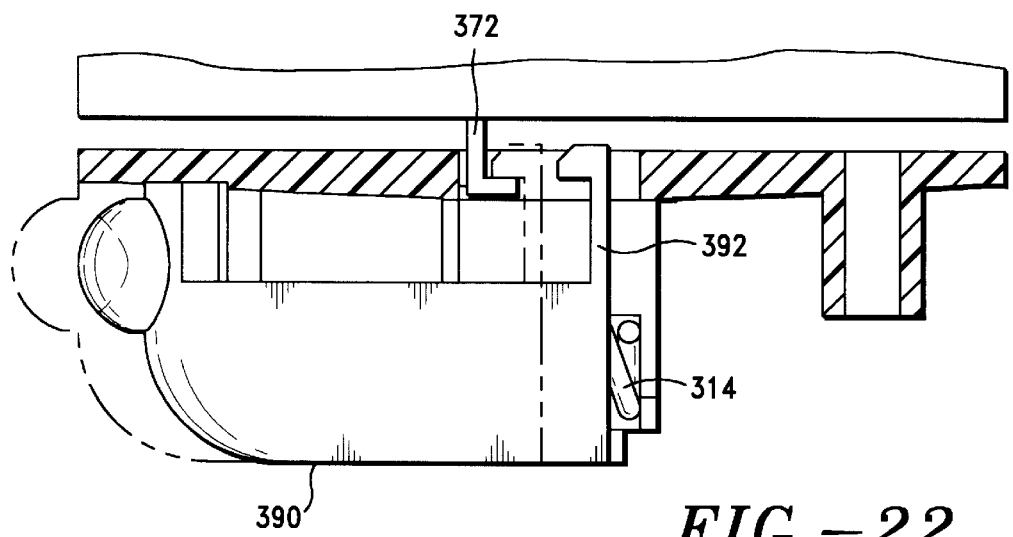
FIG. 22 is a schematic illustration of an additional embodiment of the latch engagement means, according to the invention.
Figure 23:
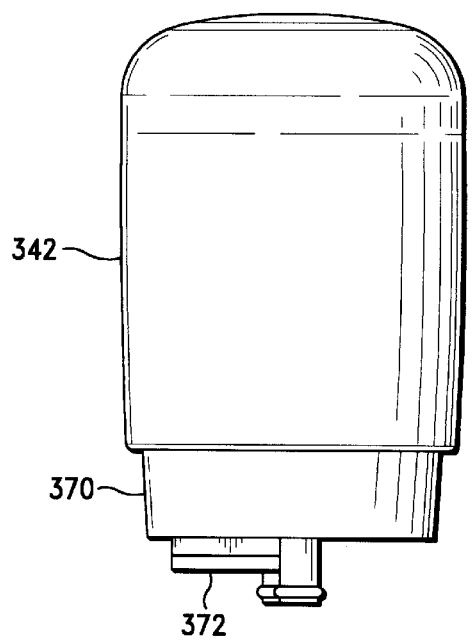
FIG. 23 is a front plan view of an additional embodiment of a water filter cartridge assembly, according to the invention.

Referring now to FIGS. 21–23, in an additional envisioned embodiment of the invention, the latch button 390 is provided with an engagement arm 392 and the cartridge base 370 is provided with a latch catch 372. Although the basic operation of the noted latch assembly 390, 372 is similar to that shown in FIG. 6 and described above (i.e., biasing of spring 314, etc.), in this embodiment, the latch button 390 engages the latch catch 372 disposed on the cartridge base 370, securing the cartridge assembly 342, in the upper housing section 22.

Referring now to FIGS. 24–28, there is shown one embodiment of the diverter valve assembly 170 of the invention. The valve assembly 170 includes a valve body 180, a valve stem 196, a valve retainer 200 and a valve handle 210.

Figure 24:
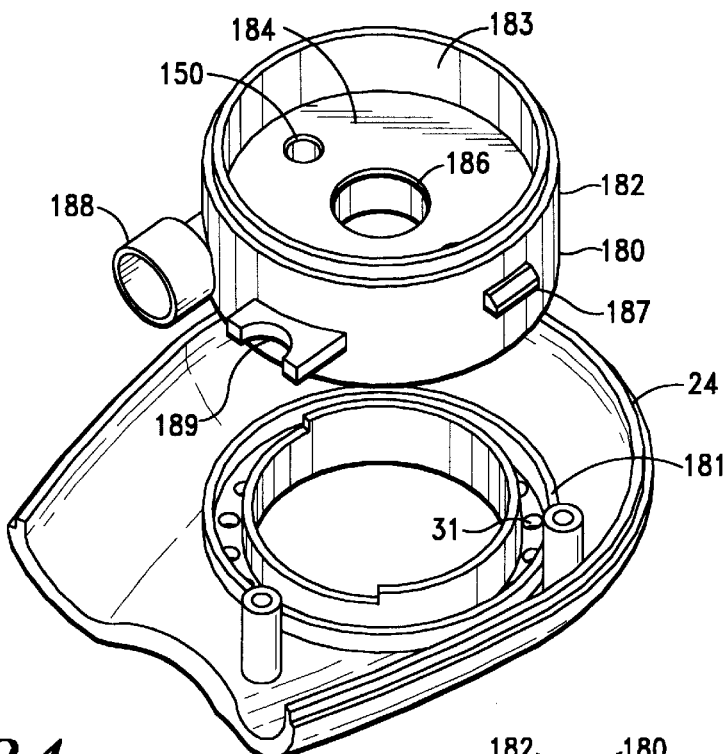
FIG. 24 is an exploded, perspective view of one embodiment of the water filter lower housing and diverter valve body assembly, according to the invention.

As illustrated in FIG. 24, the valve body 180 includes a substantially circular side wall 182 defining a chamber 183 therein. Disposed within the chamber 183 is a distributor plate 184 having a centrally located valve stem bore 186 adapted to sealably engage the valve stem 196 (see FIGS. 24–26). The distributor 184 further includes water flow channels 150, 151 and 152, discussed in detail below.

Figure 25:
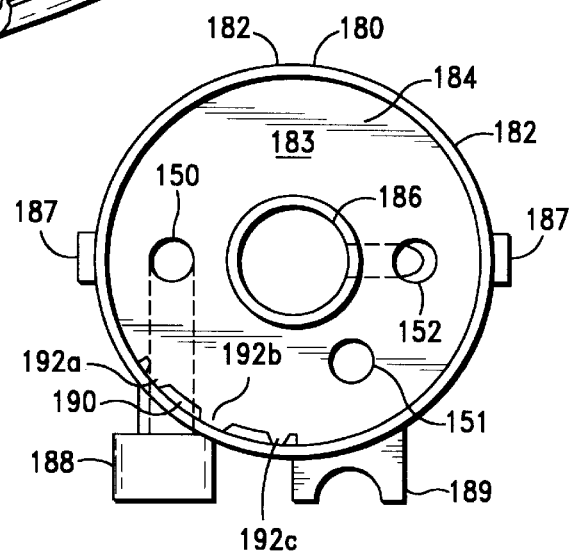
FIG. 25 is a top plan view of the diverter valve body shown in FIG. 24, according to the invention.

Referring now FIG. 25, also disposed in the valve body chamber 183 on the inside surface of the side wall 182 proximate the distributor 184 is a detent ring 190. The detent ring 190, which cooperates with the valve retainer 200 and detent ball 191, comprises a plurality of detents 192a, 192b, 192c, preferably three (3). As discussed in detail below, each detent 192a, 192b, 192c, corresponds to a respective valve assembly 170 position and, hence, water flow path.

Referring now to FIG. 24, the valve body 180 further includes an outlet duct 188 which communicates with filtered flow channel 150, a positioning tab 189 and a pair of retaining tabs 187 disposed on the outside surface of the housing side wall 182. As discussed below, the retaining tabs 187 are adapted to engage the retaining arms 23 of the upper housing section 22 upon assembly of the upper and lower housing sections 22, 24.

According to the invention, the valve body 180 may be constructed out of various light weight materials. In a preferred embodiment, the valve body 180 is constructed out of ABS.

As illustrated in FIG. 24, according to the invention, the housing lower section 24 is provided with a valve body seat 181 disposed on the inside surface thereof. The valve body seat 181 is adapted to receive the valve body side wall 182 therein. The valve body seat 181 also communicates with the plurality of outlet ports 31, which provide the unfiltered water circular discharge pattern.

According to the invention, the valve body 180 is secured in the valve seat 181 by conventional means. In a preferred embodiment, the valve body 180 is ultrasonically welded in the seat 181.

Figure 27:
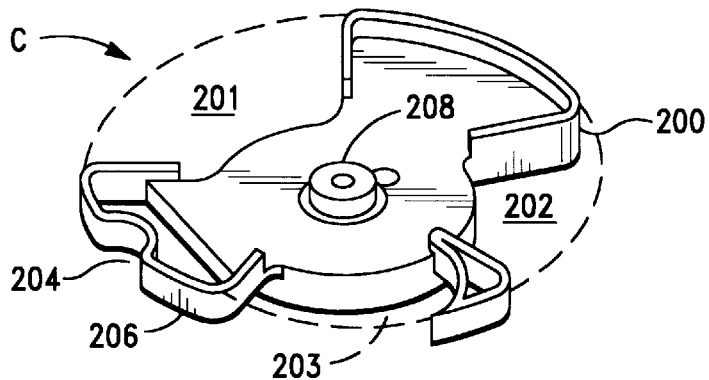
FIG. 27 is a perspective view of one embodiment of the water filter valve retainer, according to the invention.

Referring now to FIG. 27, there is shown the valve retainer 200 of the invention. The valve retainer 200 outer circumference (denoted C) preferably has a correspondingly similar shape as the inside surface of the valve body side wall 182 and includes three recesses 201, 202, 203, adapted to slidably position the valve retainer balls 204 (see FIG. 6). The retainer 200 further includes a flexible detent arm 206 having a detent ball recess 204 centrally disposed on the outer surface thereof.

According to the invention, the retainer 200 is also provided with a centrally located threaded boss 208 which is adapted to receive screw 209 during assembly (see FIG. 4). The bottom surface of the retainer 200 (not shown) is also provided with a recess having a correspondingly similar shape as the valve stem 196 engagement section 197 and a valve stem hole adapted to receive the valve stem pin 198 when operatively connected thereto.

As will be appreciated by one having ordinary skill in the art, the retainer 200 may be constructed out of various light weight, resilient materials. In a preferred embodiment, the retainer 200 is constructed out of an acetal compound.

Figure 28:
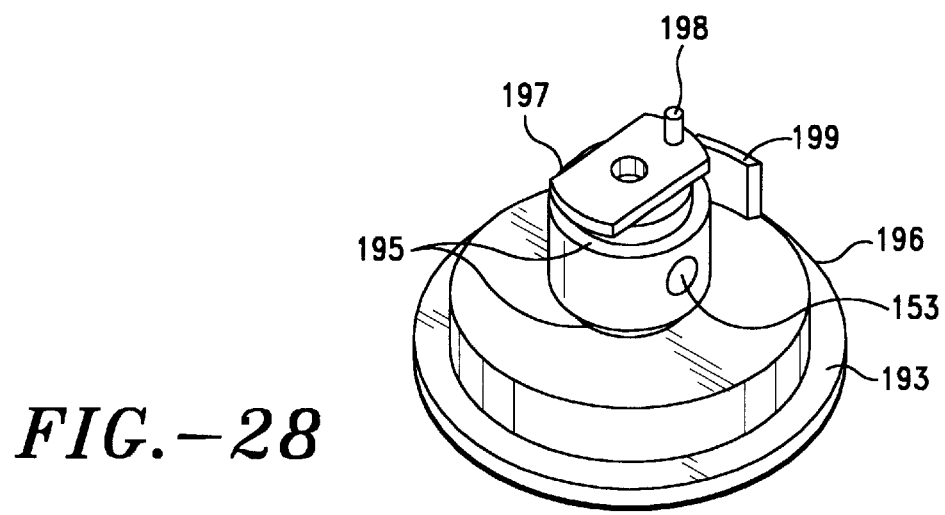
FIG. 28 is perspective view of the water filter valve stem, according to the invention.

Referring now to FIG. 28, the valve stem 196 of the invention is provided with a pair of annular grooves 195 adapted to receive O-rings 250, water port 153 disposed between the grooves 195, and an inwardly projecting valve stop 199. O-rings 250 and 253, discussed below, form an effective seal to prevent water from flowing out proximate the valve handle 210, as well as sealing valve stem 196 within distributor bore 186.

Figure 26:
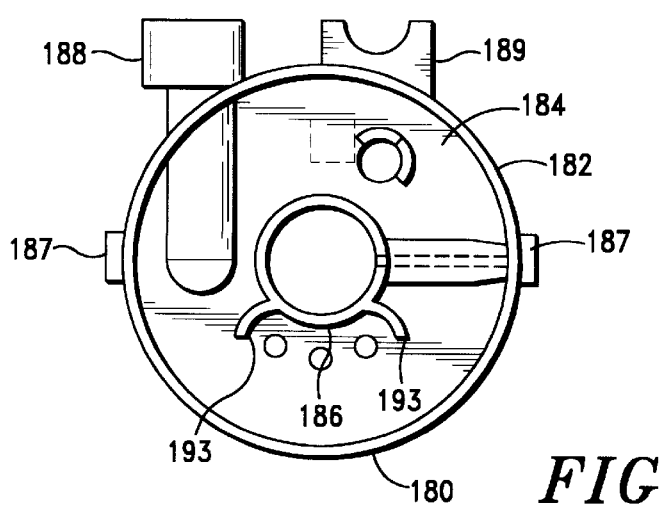
FIG. 26 is a bottom plan view of the diverter valve body shown in FIG. 24, according to the invention.

According to the invention, the valve stop 199 is positioned between the valve body stops 193 when the valve stem 196 is disposed in the bottom section of the valve body 180 (see FIG. 26). According to the invention, the valve body stops 193 limit rotation of the valve stem 196 and, hence, valve assembly 170.

Referring now to FIG. 4, the valve assembly 170 further includes a valve handle 210. The upper portion of the valve handle base 212 is provided with a raised valve stem retainer seat 214. The retainer seat 214 is adapted to engage the retainer recess disposed on the bottom surface thereof, which has a correspondingly similar shape (not shown).

According to the invention; the valve assembly 170 is assembled in the lower housing section 24 as follows: (i) O-rings 250 are inserted into valve stem annular grooves 195, (ii) outer O-ring 251 is positioned on the valve stem outer ring seat 193, (iii) valve stem 196 is positioned in the valve stem hole 186, (iv) the valve retainer 200 is positioned in the valve body chamber 183, (v) valve balls 204 are positioned in the valve retainer recesses 201, 202, 203 and detent ball 191 is positioned in retainer recess 204, and (vi) valve handle 210 (with O-ring 253) is operatively connected to the bottom of the valve stem 196 (see FIGS. 6, 31). The valve assembly 170 and aerator assembly 230, discussed in detail below, are secured in the noted position via screw 209, which is adapted to engage the retainer boss 208.

Referring now to FIG. 6, in operation, the valve handle 210 is manually rotated, rotating valve stem 196 and, hence, valve retainer 200. As the retainer 200 rotates, detent ball 191 is moved from one detent position to another, which corresponds to the three (3) valve positions—(i) filtered discharge, (ii) unfiltered "shower spray" discharge, and (iii) unfiltered aerated discharge—discussed in detail below.

As the retainer 200 rotates, valve balls 204 also rotate within the valve body chamber 183. As illustrated in FIG. 6, the retainer recesses 201, 202, 203 are designed and adapted to position the balls 204 proximate a selected two (2) of the outlet ports 150, 151, 152. According to the invention, the selected ports (e.g., 150,151) are consequently sealed by the balls 204 with the remaining port (e.g., 152) having substantially unrestricted water flow therethrough Referring now to FIG. 29, as discussed above, the distributor plate 184 encases water flow channels 150, 151, 152. Water flow channel 150 is the filtered flow channel that communicates with the valve body outlet duct 188. As illustrated in FIG. 6, the outlet duct 188 communicates with the inlet duct 130 of the flow monitor 124.

Figure 31:
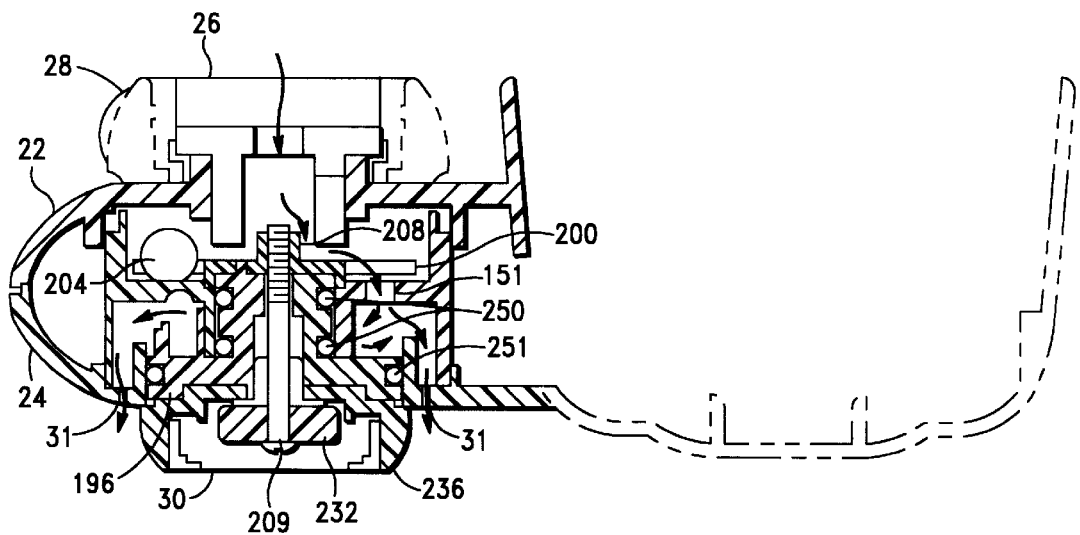
FIG. 31 is a partial cross-sectional view of the water filter, illustrating the unfiltered, shower spray water flow path, according to the invention.

Referring now to FIG. 31, flow channel 151 directs unfiltered water flow to and through the outlet ports 31 of water outlet 30. As discussed above, the outlet ports 31 provide a substantially circular discharge pattern of the unfiltered water therethrough.

Figure 32:
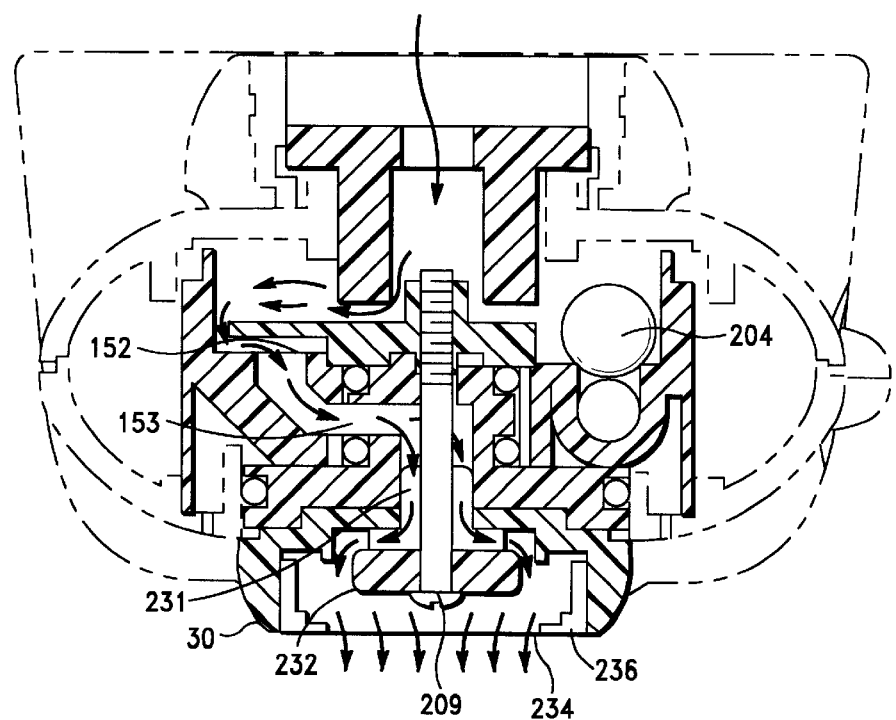
FIG. 32 is a partial cross-sectional view of the water filter, illustrating the unfiltered, aerated water flow path, according to the invention.

Referring now to FIG. 32, water flow channel 152 directs unfiltered water to the aerator assembly 230 of the invention, which comprises an aerator element 232, an aerator screen 234 and an aerator cap 236. According to the invention, flow channel 152 directs unfiltered water flow into and through valve stem port 153, into and through aerator port 231, around aerator element 232, and through the aerator screen 234.

Figure 33:
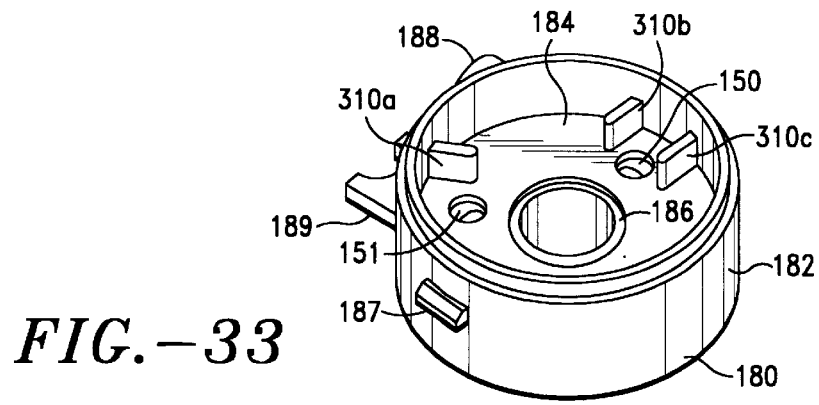
FIG. 33 is a perspective view of an additional embodiment of the diverter valve body, according to the invention.
Figure 34:
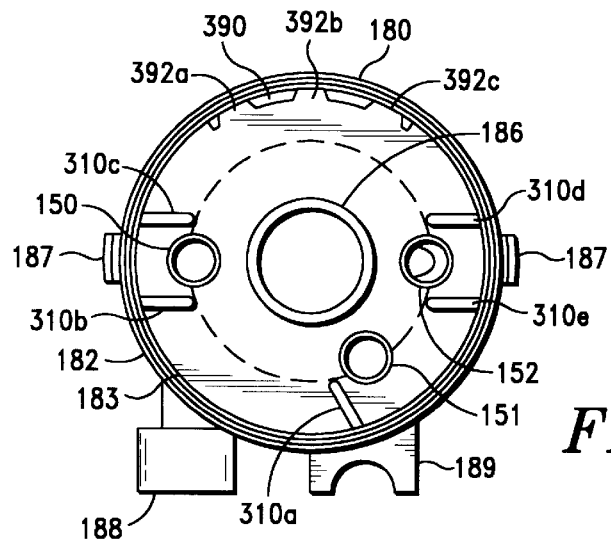
FIG. 34 is a top plan view of the diverter body shown in FIG. 33, according to the invention.

Referring now to FIGS. 33 and 34, there is shown an additional envisioned embodiment of the diverter valve assembly 170 of the invention, in which identical components are shown by the same reference numeral.

As illustrated in FIG. 34, the valve body 180 similarly includes a detent ring 390 disposed on the inside surface of the side wall 182 proximate the distributor 184. However, in the noted embodiment, the detent ring 390 is disposed substantially opposite the outlet duct 188. The detent ring 390 comprises a plurality of detents 392a, 392b and 392c, which are similarly adapted to cooperate with the valve retainer 200 and detent ball 191.

The valve body 180 further includes a plurality of valve ball guides 310a–310e. As illustrated in FIG. 33, the guides 310a–310e preferably comprise substantially planer projections disposed on the distributor 184 proximate the flow channels 150,151,152. In a preferred embodiment, five guides are employed; a pair of guides 310b and 310c disposed on opposite sides of channel 150, a pair of guides 310d and 310e disposed on opposite sides of channel 152 and a single guide 310a disposed on the outboard side of channel 151.

Figure 35:
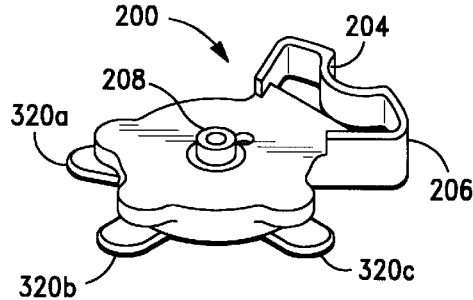
FIG. 35 is a perspective view of an additional embodiment of the water filter valve retainer, according to the invention.
Figure 36:
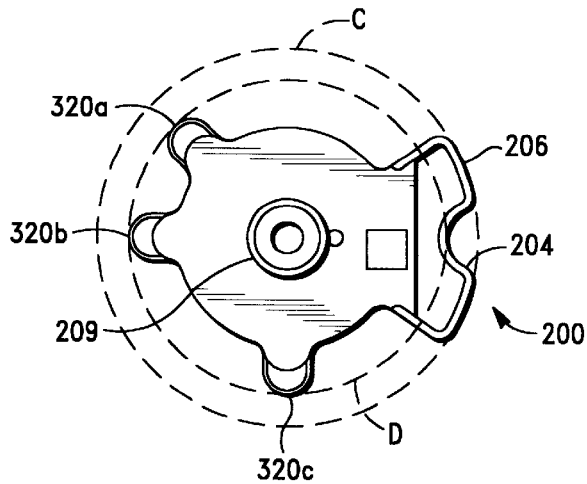
FIG. 36 is a top plan view of the valve retainer shown in FIG. 35, according to the invention.

Referring now to FIGS. 35–36, there is shown the valve retainer 200 of the noted valve assembly embodiment. The retainer 200 similarly includes a flexible detent arm 206 having a detent ball recess 204 centrally disposed on the outer surface thereof.

As illustrated in FIG. 36, the retainer 200 includes a plurality of outwardly projecting retainer guides 320a, 320b and 320c. According to the invention, the outer circumference defined by the outside edge of the guides 320a–320c (denoted D) is slightly less (~0.002–0.008 in.) than the valve chamber circumference defined by the ball guides 310a–310e (denoted E) (see FIG. 34).

In operation, when the valve handle 210 is rotated, valve retainer 200 and, hence, retainer guides 320a–320c rotate within valve body chamber 183. As the retainer 200 rotates, a respective one of the guides 320a–320c (e.g., 320a) contacts and, hence, slightly displaces a respective valve ball 204, opening a respective flow channel 150–152 (e.g., 150).

Figure 39:
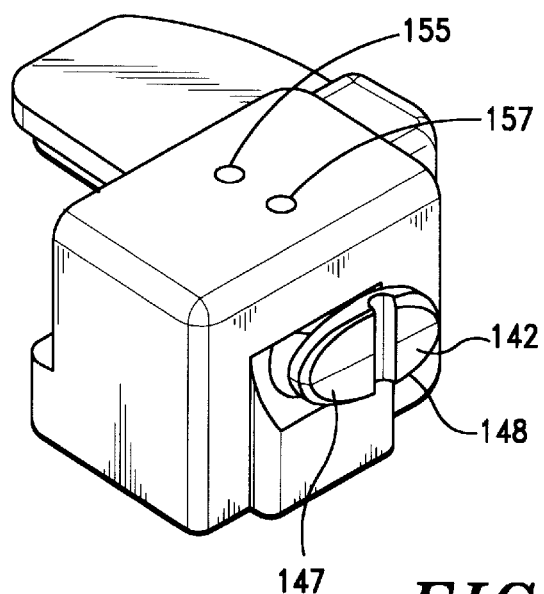
FIG. 39 is a perspective view of the water filter end-of-use indicator electronic module, according to the invention.
Figure 37:
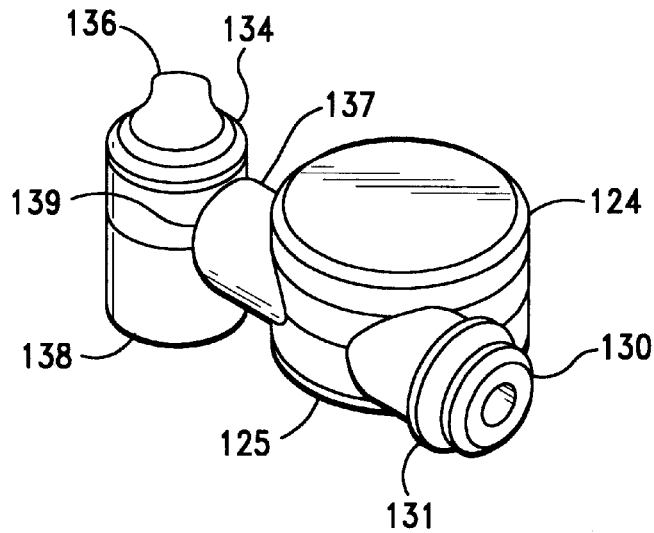
FIG. 37 is a perspective view of the water filter end-of-use indicator flow monitor, according to the invention.
Figure 38:
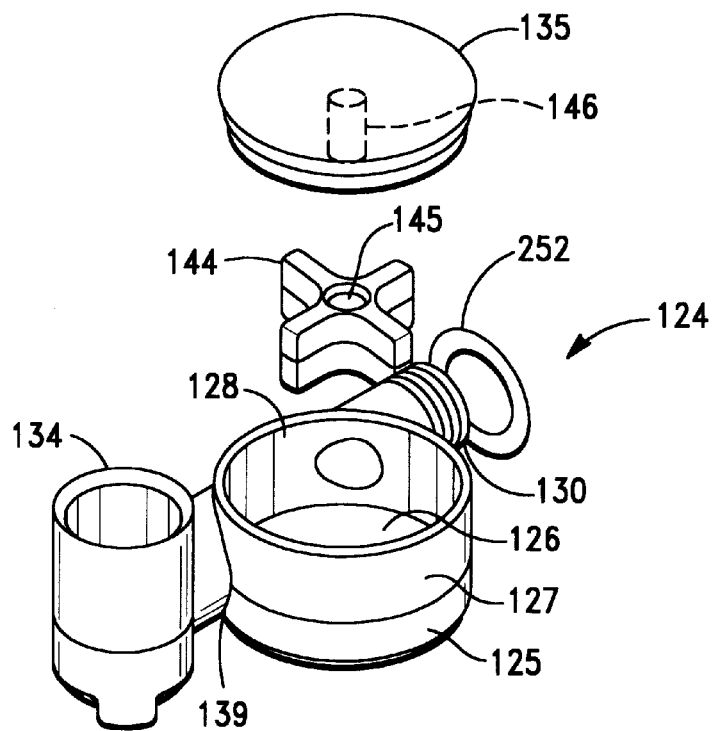
FIG. 38 is a an exploded, perspective view of the flow monitor shown in FIG. 37, according to the invention.

Referring now to FIGS. 37–39, there is shown the end-of-use indicator assembly 124, 140 of the invention. According to the invention, the indicator assembly 124, 140 includes means for monitoring at least one pre-determined event, the imminent occurrence and the non-imminent occurrence of the pre-determined event, processing means responsive to the monitoring means, and signaling means, responsive to the processing means, for informing the user that the pre-determined event has occurred, is imminent and non-imminent. The term "non-imminent," as used herein, means that the filter element 46 is functional and that the event is sufficiently remote so that the user need not be concerned about additional use of the filter assembly 40. The term "imminent," as used herein, means that the filter element 46 is still functional but that the event is about to occur and that the user should prepare to replace the filter assembly.

As discussed in detail below, the signaling means includes (i) a programmed integrated circuit or processing means (e.g., microprocessor) responsive to the pre-determined event monitoring means for selectively operating the signal means and (ii) at least one light source to provide visual indications of the status of the filter element 46. In additional envisioned embodiments of the invention, the signaling means includes at least one audible source or signal.

In a preferred embodiment, discussed below, the indicator assembly 124, 140 includes means for monitoring two (2) pre-determined events—volume of fluid flow through the filter cartridge assembly 40 and time in use of the filter assembly 40—and the signaling means provides two (2) visual indications informing the user that one or both of the noted pre-determined events is non-imminent or has occurred.

According to the invention, the end-of-use indicator assembly 124, 140 preferably includes a water flow monitor 124 and an electronic module 140. As illustrated in FIGS. 37 and 38, the monitor 124 includes a housing 125 having bottom and side walls 126, 127 defining a chamber 128 therein, an input duct 130, an outlet duct 134 and a cap 135.

Referring to FIG. 37, the inlet duct 130 includes an annular groove 131, which is adapted to engage and position O-ring 252. As illustrated in FIG. 6, according to the invention, the inlet duct 130 is adapted to slideably engage the diverter body outlet duct 188.

The outlet duct 134, which is adapted to receive and, hence, communicate with the water inlet port 76 of the filter cartridge assembly 40, preferably includes a primary duct 137 and a secondary duct 138, having an end cap 136 disposed on one end thereof. As illustrated in FIG. 37, the primary duct 137 is preferably positioned on the monitor housing 125 on a substantially parallel plane as the outlet duct 131 and substantially in alignment therewith.

According to the invention, the secondary duct 138, which is in fluid communication with the primary duct 137, is connected to the primary duct 137 through the secondary duct side wall 139. The secondary duct 138 is thus substantially perpendicular to the primary duct 137.

The noted outlet duct 134 configuration facilitates engagement of the outlet duct 134 to the cartridge assembly inlet port 76, when the cartridge assembly 40 is positioned on the filter housing 20. As will be appreciated by one having ordinary skill in the art, various outlet duct 134 configurations may be employed with in the scope of the invention to achieve effective communication to and from the monitor 124 and cartridge assembly water inlet 76.

Referring now to FIG. 38, disposed within the monitor housing chamber 128 is a substantially "cross-shaped" magnet 144. However, as will be appreciated by one having ordinary skill in the art, the magnet 144 may comprise various shapes.

The outer circumference of the cross-shaped magnet 144 preferably has a correspondingly similar shape as the housing chamber 128 to facilitate positioning of the magnet 144 in the chamber 128. The magnet 144 includes a mounting hole 145, which is adapted to rotatably receive the monitor pin 146 disposed on the inside surface of the monitor cap 135.

According to the invention, various materials may be employed to construct the magnet 144. In a preferred embodiment, the magnet comprises strontium ferrite and nylon 12.

Referring now to FIG. 39, the indicator assembly 123 further includes an electronic module 140. In a preferred embodiment, the module 140 includes an internal clock for monitoring the time in use of the filter cartridge assembly 40, a conventional reed switch (not shown), which is disposed on the module arm 141, and processing means, which includes an appropriate memory (volatile or non-volatile) for storing the program and the signals necessary for determining the stage in which the filter 16 is operating. Referring now to FIG. 4, the monitor 124 and module 140 are positioned within the upper housing section 22 such that the module arm 141 is disposed in close proximity to the module housing 124 to provide effective communication from the magnet 144 to the reed switch.

In operation, upon water flowing into and through the monitor 124, the magnet 144 rotates about pin 146. The magnet 144 actuates the reed switch, which provides an output signal to the module 140 processing means.

In a preferred embodiment, the processing means are responsive to the monitoring means time in use and volume of water flow through the monitor 124 (and, hence, filter cartridge assembly 40) and provides output signals indicative that (i) the pre-determined maximum volume of water flow into the filter cartridge is non-imminent, (ii) the pre-determined maximum volume of water flow into the filter cartridge has occurred, (iii) the pre-determined maximum time in use of the filter cartridge is non-imminent, and (iv) the pre-determined maximum time in use of the filter cartridge has occurred. In additional envisioned embodiments, the processing means provides output signals indicative that the pre-determined maximum volume of water flow into the filter cartridge is imminent and the pre-determined maximum time in use of the filter cartridge 16 imminent.

The processing means is further programmed such that (i) when the output signal of the pre-determined event monitoring means is indicative of the non-imminent occurrence of the pre-determined event (i.e., maximum volume of fluid flow through the filter assembly 40 or maximum time in use of the filter assembly 40), the signaling means is operated to provide a first output signal and (ii) when the output signal of the pre-determined event monitoring means is indicative of the past occurrence of the pre-determined event, the signaling means if operated to provide a second output signal.

In additional envisioned embodiments, the processing means is programmed such that when the output signal of the pre-determined event monitoring means is indicative of the imminent occurrence of the pre-determined event, the signaling means is operated to provide a third output signal.

Referring now to FIG. 39, the module 140 includes a dual spectrum indicator light, which is adapted to be slidably positioned within the indicator port 143 disposed on the upper housing section 22. According to the invention, the light 142 is operatively connected to the module processing means and provides distinct visual indications indicative of the status of the filter element 46 in response to the signaling means first and second output signals.

By way of example, upon replacement of the cartridge assembly 40, the light 142 will provide a green 147 illumination (on one side thereof) in response to the signaling means first output signal, indicating safe and effective filtration. Upon either a pre-determined period of time or volume of water flow through the monitor 124, the light 142 will provide a red 147 illumination in response to the signaling means second output signal, indicating that replacement of the filter assembly 40 is due.

In additional envisioned embodiments, the module 140 includes a liquid crystal display (LCD) to provide visual indications of the status of the filter element 46. As will be appreciated by one having skill in the art, various LCD configurations may be employed within the scope of the invention.

As illustrated in FIG. 39, the module 140 is further provided with a volume switch 155 and a reset switch 157, which are positioned substantially in alignment with the interface plate switch ports 117 when the module 140 and interface plate 120 are operatively positioned in the upper housing 22. In a preferred embodiment, the switches 155, 157 are adapted to communicate with and be positioned by the volume pin 156 and reset pin 158 disposed on the bottom wall 72 of the cartridge assembly base 70 (see FIG. 15) when the cartridge assembly 40 is positioned in the cartridge assembly seat 29.

In a preferred embodiment, the reset switch 157 provides a signal indicating the replacement of the filter assembly 40. The volume switch 155 provides a signal indicating the filter cartridge assembly 40 volume (e.g. 100 gal., 200 gal.). For example, if the filter cartridge assembly base 70 employs a volume pin 156, as illustrated in FIG. 11, upon engagement of the pin 156 and the switch 155, the module switch 155 would provide a signal indicating a 200 gal. cartridge assembly 40. In the absence of the volume pin 156, the volume switch 155 would provide a signal indicating a 100 gal. cartridge assembly.

According to the invention, the end-of-use indicator is further provided with a battery (not shown) to provide power to the monitoring, processing and signaling means. In a preferred embodiment, the battery has an operating life in the range of five (5) to fifteen (15) years, eliminating the need for regular replacement.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A water filter apparatus, comprising:

a base having first and second ends;

said base including a water inlet upstanding from a first end of said base and attachable to a water faucet, a first water outlet downwardly directed from said first end of said base for discharging unfiltered water, a second water outlet downwardly directed from a second end of said base for discharging filtered water and a filter cartridge seat;

a replaceable filter cartridge, said cartridge comprising a subassembly including a closed outer cylindrical shell having top and side walls defining a chamber therein, a filter element disposed within said filter chamber and a filter cartridge base, said filter base including an outlet port in communication with said base second water outlet, said filter cartridge base including a reset pin;

a diverter valve having an outlet duct, in communication with said water inlet, for selectively permitting the flow of water through said base first water outlet and said filter cartridge;

latch means for releasably securing said cartridge in said cartridge seat; and an end-of-use indicator in communication with said diverter valve and said filter cartridge, said indicator including flow monitoring means for monitoring the volume of water flow into said filter cartridge, processing means responsive to said monitoring means for recording the total volume of water flow into said filter cartridge and the time of use of said filter cartridge, and signaling means responsive to said processing means for providing at least first and second output signals, said processing means being programmed to provide outputs indicative (i) that a first cumulative volume of water flow into said filter cartridge has occurred, is imminent and is non-imminent and (ii) that a first cumulative time of use of said filter cartridge has occurred, is imminent and is non-imminent, said end-of-use indicator including a reset switch and cartridge volume switch, said reset switch being adapted to communicate with and be positioned to a first initializing position by said reset pin upon said filter cartridge being releasably secured in said cartridge seat by said latch means.

2. The water filter of claim 1, wherein said filter cartridge includes an annular water distribution chamber surrounding said filter element.

3. The water filter of claim 2, wherein said filter cartridge base includes an inlet port in communication with said annular chamber.

4. The water filter of claim 1, wherein said flow monitor means includes a housing having a chamber, an input channel, in communication with said diverter valve outlet duct, and an output channel, in communication with said filter cartridge base inlet port.

5. The water filter of claim 4, wherein said flow monitor means includes a magnet rotatably mounted within said monitor chamber for providing said first output signal to said signaling means.

6. The water filter of claim 1, wherein said cartridge base includes a volume pin indicating the volume of said filter cartridge.

7. The water filter of claim 6, wherein said cartridge volume switch communicates with and is positioned to a second initializing position by said volume pin upon said filter cartridge being secured in said cartridge seat by said latch means, said second initializing position indicating the volumetric capacity of said filter cartridge.

8. A water filter apparatus, comprising:

a housing having a horizontally disposed base, said base having first and second ends;

said housing including a water inlet upstanding from a first end of said base and attachable to a water faucet, a first water outlet downwardly directed from said first end of said base for discharging unfiltered water, a second water outlet downwardly directed from a second end of said base for discharging filtered water and a filter cartridge seat disposed on said second end of said base, said water outlet including a latch flange;

a replaceable filter cartridge, said cartridge comprising a subassembly including a closed outer cylindrical shell having top and side walls defining a chamber therein, a filter element disposed within said filter chamber, a top filter end cap disposed on one end of said filter element, a lower flow through filter cap disposed on the opposite end of said filter element and a filter base, said chamber including an annular water distribution chamber surrounding said filter element, said filter base including an inlet port in communication with said annular chamber and an outlet port in communication with said base second water outlet;

a diverter valve, in communication with said water inlet, for selectively permitting the flow of water through said first water outlet and said filter cartridge, said valve including an outlet duct;

latch means for releasably securing said cartridge in said cartridge seat, said latch means including a latch button, a latch slide slideably connected to said latch button and a spring, said spring providing a first biasing force to said latch slide, said latch slide being adapted to engage said latch flange upon said filter cartridge being positioned in said housing cartridge seat; and an end-of-use indicator disposed within said base, said indicator having passive reset means, said indicator including signaling means for providing at least first and second output signals, a flow monitor having a moveable self-contained source of stimulus, sensor means, responsive to said source of stimulus, for providing a third output signal indicating motion of said source of stimulus, monitoring means for monitoring the time of use of said filter cartridge, and processing means in communication with said signaling means, said processing means being responsive to said third output signal and said monitoring means to provide a fourth output signal indicative that the a first cumulative volume of water flow into said filter cartridge is non-imminent, a fifth output signal indicative that said first cumulative volume of water into said filter cartridge has occurred, a sixth output signal indicative of a first time in use of said filter cartridge is non-imminent and a seventh output signal indicative of said first time in use of said filter cartridge has occurred, said monitor including a housing having top, bottom and side walls defining a chamber therein, an input channel, in communication with said monitor housing chamber and said diverter valve outlet duct, and an output channel, in communication with said monitor housing chamber and said filter cartridge base inlet port, said self-contained source of stimulus being rotatably mounted within said monitor housing chamber whereby said source of stimulus rotates upon fluid flow into and through said chamber.

9. The water filter of claim 8, wherein said monitoring means provides an eighth output signal indicative that said first cumulative volume of water flow in said filter cartridge is imminent and a ninth output signal indicative that said first time in use of said filter cartridge is imminent.

10. The water filter of claim 8, wherein said passive reset means includes a reset switch and a cartridge volume switch.

11. The water filter of claim 10, wherein said cartridge base includes a reset pin.

12. The water filter of claim 11, wherein said reset switch communicates with and is positioned to a first initializing position by said reset pin upon said filter cartridge being releasably secured in said cartridge seat by said latch means.

13. The water filter of claim 8 wherein said source of stimulus comprises a magnet.

14. The water filter of claim 8, wherein said signaling means includes a light source.

15. The water filter of claim 8, wherein said signaling means includes an audible source.

16. A replaceable filter cartridge assembly for a water filter having a filter cartridge latch assembly and an end-of-use indicator, comprising:

a subassembly including a closed outer cylindrical shell having top and side walls defining a chamber therein, a filter element disposed within said filter chamber and a filter cartridge base, said chamber including an annular water distribution chamber surrounding said filter element, said base including an inlet port, in communication with said annular chamber, and an outlet port, said outlet port including a latch flange adapted to engage said filter cartridge latch assembly, said filter cartridge base further including means for communicating with said end-of-use indicator for resetting said indicator and indicating the volumetric capacity of said filter cartridge assembly.

\* \* \* \* \*